July 21, 1970  R. L. DYBVAD ET AL  3,521,484
LOAD MEASURING SYSTEM
Filed Dec. 15, 1967  4 Sheets-Sheet 1
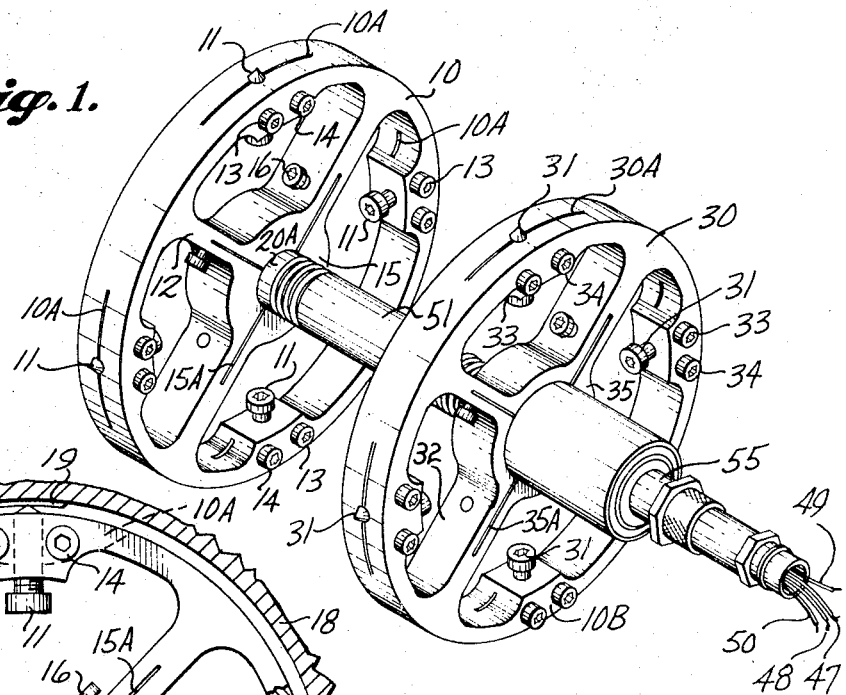
INVENTORS
RICHARD L. DYBVAD
PHILIP J. JOHANSEN
BY Christensen, Sanborn, & Matthews
ATTORNEYS July 21, 1970  R. L. DYBVAD ET AL  3,521,484
LOAD MEASURING SYSTEM
Filed Dec. 15, 1967  4 Sheets-Sheet 2
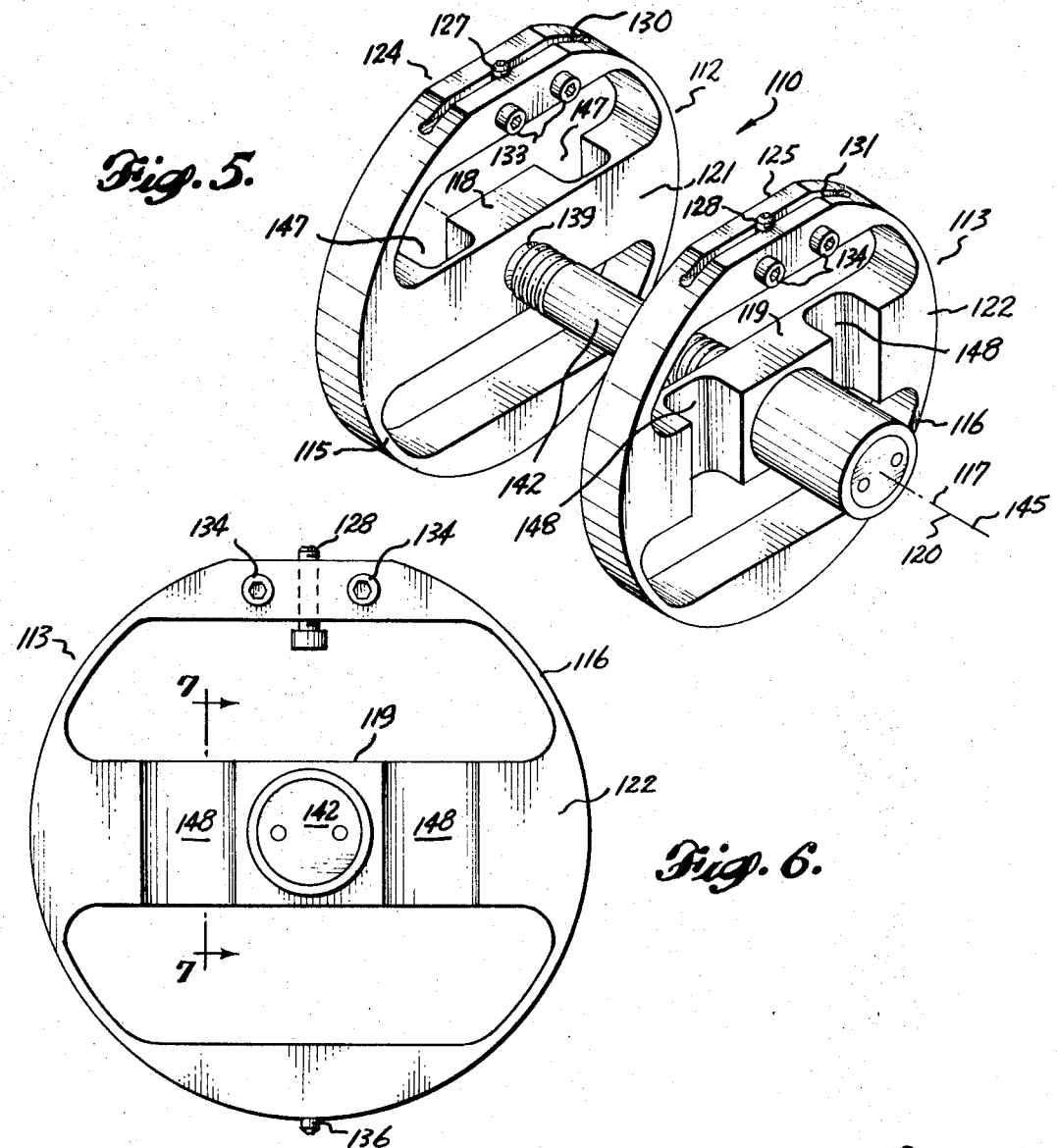
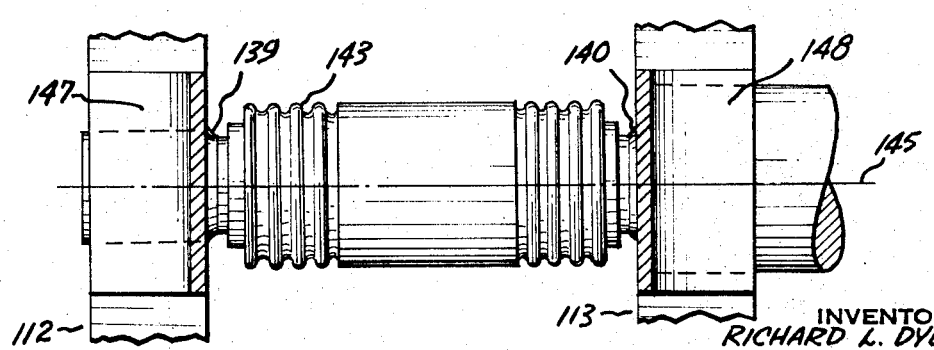
INVENTORS
RICHARD L. DYBVAD
PHILIP J. JOHANSEN
BY
Christensen, Sanborn & Matthews
ATTORNEYS

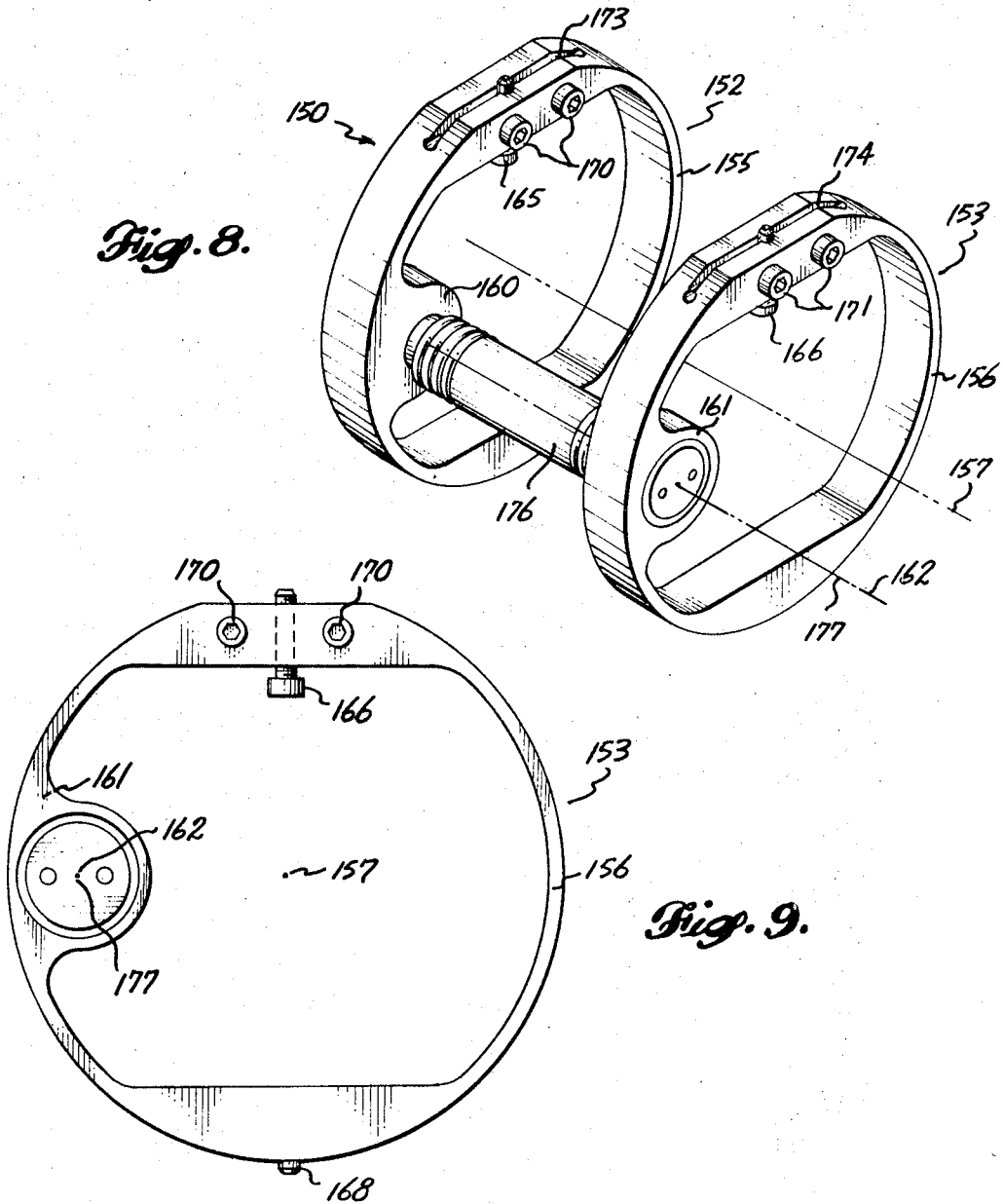

July 21, 1970   R. L. DYBVAD ET AL   3,521,484
LOAD MEASURING SYSTEM

Filed Dec. 15, 1967   4 Sheets-Sheet 4

INVENTORS
RICHARD L. DYBVAD
PHILIP J. JOHANSEN
BY
Christensen, Sanborn & Matthews
ATTORNEYS

United States Patent Office 3,521,484
Patented July 21, 1970

3,521,484
LOAD MEASURING SYSTEM
Richard L. Dybvad, Seattle, and Philip J. Johansen, Alderwood Manor, Wash., assignors to Electro Development Corporation, Lynnwood, Wash., a corporation of Washington
Continuation-in-part of application Ser. No. 620,691, Mar. 6, 1967. This application Dec. 15, 1967, Ser. No. 702,149
Int. Cl. G01l 1/22
U.S. Cl. 73—88.5                                    7 Claims

ABSTRACT OF THE DISCLOSURE

A device for measuring the load on a hollow beam such as an axle of a vehicle. A pair of spring discs of generally cylindrical configuration are provided with locking screws for securing the discs a predetermined axial distance apart on the interior of a hollow structural member and for preventing movement of the discs relative to the structural member. The spring disc may include a portion thereof extending inwardly to connect the outer portion of each to an associated interior support collar. The location of the interior support collars and the locking screws in the outer perimeter of each disc is such that shear forces are properly transmitted to the sensing beam held by the interior collars, while the discs are able to deform as the axle becomes oblate during bending and thereby react no significant hoop forces back to the structural member. The sensing beam carried by the interior collars is provided with bonded strain gauges connected in a bridge circuit. A protective metal bellows is provided around the strain gauges.

CROSS REFERENCE TO RELATED APPLICATIONS

This application is a continuation-in-part of application Ser. No. 620,691 filed Mar. 6, 1967, and now abandoned, entitled "Load Measuring System."

BACKGROUND OF THE INVENTION

Field of the invention

This invention relates to an apparatus for measuring the load on a structural member and more particularly to a measuring apparatus which is placed within a hollow member such as an aircraft wheel axle to sense its deflection for determination of the weight carried by the hollow member.

Description of the prior art

It is often essential that the total load borne by a structural member as well as the center of gravity of a craft be accurately known. In the air transport industry, for example, it is essential for proper aircraft loading to know the location of the center of gravity of the craft and also the weight of the aircraft and its cargo. Another example is in the trucking industry wherein the load on the various axles of the vehicle must be known to insure compliance with load restrictions imposed by most states. Strain gauges and bridge circuits have been used in the past for determining such load factors. Various techniques have been used for locating the strain gauges in proper relation to one or more of the axles of such vehicles as trucks and aircraft. The strain gauges are generally fragile and installation of the same has presented problems. In many prior art techniques for determining load factors the strain gauges must be carefully calibrated after installation, leads must be soldered or welded, cement must be cured, and also protection of the gauges is difficult. In the event of failure the above steps must again be followed, leading to a time consuming and costly operation.

It is thus an object of the present invention to provide an improved apparatus for determining the weight if a vehicle wherein replacement of the transducer is an easy matter.

Another object of the present invention is to provide a load measuring apparatus which can be installed inside a hollow structural member to provide a measure of the load borne by the member.

An additional object of the present invention is to provide an improved load measuring apparatus including a sensing beam and holder assembly so constructed that the holder assembly can be left in position in the interior of a hollow structural member with the sensing beam being removably held thereby.

Another object is to provide such an apparatus wherein the transducer assembly can be pre-calibrated and thus no recalibration of the system of which the transducer is a part is required should transducer replacement become necessary.

An additional object of the present invention is to provide an improved force-transmitting system adapted for attachment to the interior of a hollow structural member for transmitting forces to strain gauges on the sensing beam carried by the system, the arrangement being such that shear forces on the structural member cause output signals to be generated.

A still further object of the instant invention is to provide a unitary measuring device which is capable of withstanding high shock loading without movement of the device relative to the hollow member in which it is held.

SUMMARY OF THE INVENTION

The above and additional advantages of the instant invention are accomplished through a system which includes a pair of cylindrical discs in the shape of "wheels" having an interiorly extending portion which supports an inner collar or hub. A sensing beam having strain gauges bonded thereto may be removably held by the hubs or form a unitary structure including the hubs and rims. The arrangement is such that shear forces on the structural member cause proportional output signals from the strain gauges. Appropriate locking means in the form of set screws are provided for holding the sensing beam in accurate position within the spring discs. The spring discs (or "wheels" themselves are provided with at least two radially outwardly extending locking means adapted to be firmly engaged with the interior wall of the hollow structural member for holding the entire assembly in accurate position and preventing slippage of the discs as the structural member is subjected to a load. The disc holding screws are so related to the interiorly extending portions that the forces to be measured are properly transmitted by such portions to the gauges.

In one preferred embodiment of the invention protective pads are bonded to the interior of the structural member and positioned for engagement by the hardened steel set screws of the spring discs. The arrangement is such that the high shear strength of the bond prevents relative movement between pad and axle while the screws prevent slippage of the discs relative to the pads. The structural member is thus protected against any damage which might originate from marks left by the set screws.

In other embodiments the disc and sensing beam are made unitary to withstand high shock loading.

To provide access to the locking means within structural members having smaller interior diameters, other embodiments are configured with the supporting hub and sensing beam laterally displaced from the central axis of the disc.

These and other features and advantages of the invention will become more clearly apparent from the following detailed description thereof, which is to be read with reference to the accompanying drawings.

BRIEF DESCRIPTION OF THE DRAWINGS

FIG. 1 is an isometric view of a preferred embodiment of the load measuring system. FIG. 1A is a diagrammatic illustration of the sensing beam as deformed by shear forces in the axle. FIG. 1B is a schematic circuit diagram showing the bridge circuit of the strain gauges. FIG. 1C is a schematic sectional drawing on a reduced scale showing the location of the load sensing apparatus of FIG. 1 placed inside the axle of an airplane.

FIG. 2 is a cross-sectional view of a structural member such as an axle with the rearmost spring disc of FIG. 1 in position within the interior of the hollow structural member.

FIG. 3 is a cross-sectional view of the sensing beam and holding hubs of the apparatus shown in FIG. 1.

FIG. 4 is an end view (on reduced scale) of a second embodiment of the disc portion of the system wherein the disc has only two set screws and two spokes.

FIG. 5 is an isometric view of a third embodiment of the instant invention illustrating a unitary form thereof.

FIG. 6 is an end elevation view of the measuring assembly shown in FIG. 5.

FIG. 7 is a cross-sectional view of the sensing beam as seen from line 7—7 of FIG. 6.

FIG. 8 is an isometric view of a fourth embodiment of the measuring assembly of the instant invention illustrating a unitary form thereof with the sensing beam positioned laterally of the central axis of the supporting discs.

FIG. 9 is an end elevation view of the measuring assembly shown in FIG. 8.

DESCRIPTION OF THE PREFERRED EMBODIMENTS

Figure 10:
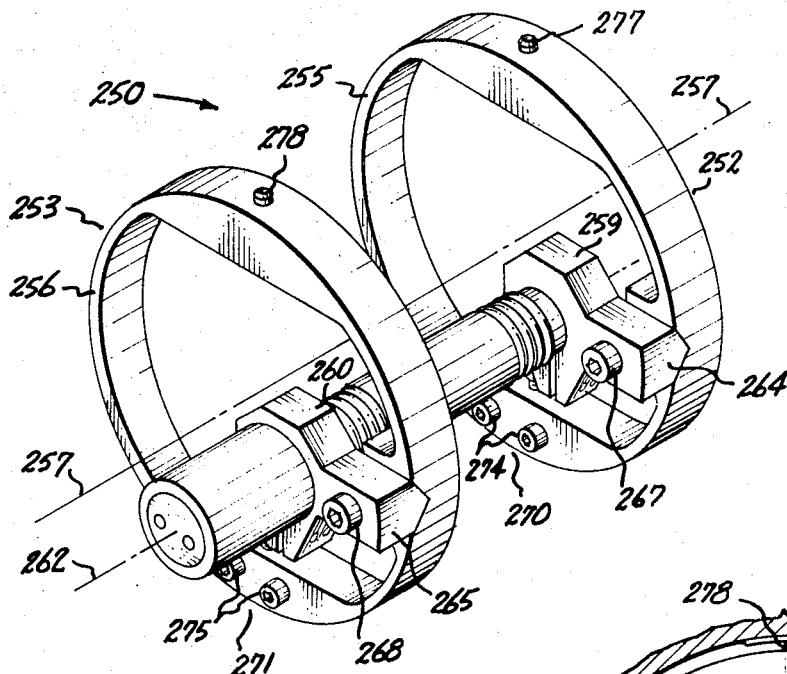
FIG. 10 is an isometric view of a fifth embodiment of the measuring assembly of the instant invention illustrating a configuration thereof in which the sensing beam is removably mounted in a laterally offset position from the central axis of the supporting discs.

Referring now to the drawings and in particular to FIGS. 1 and 2 it will be seen that a first sensing beam support member 10 in the general shape of a section of a right circular cylinder (and thus referred to as a disc or collar) is provided with four circumferential slots 10A each having a pointed set screw 11 threaded therethrough. Each set screw 11 is adapted to be adjusted in a radial direction and then locked in position by the locking screws 13 and 14 threaded through the enlargement 10B of the outer portion of the disc member 10. The member 10 is preferably made of metal such as steel or aluminum and can be described as a spring disc or collar.

The spring disc 10 is shown as having four radially extending supports or spokes 12 located in the four quadrants of the disc and serving to support the central hub 15. It is important to note that the set screws are located intermediate adjacent spokes and not in alignment therewith. The central hub 15 is provided with four radial slots 15A, each of which is adapted to be closed by means of the associated set screws 16 threaded perpendicularly with respect thereto. The arrangement is such that the axial opening in the hub 15 is adapted to receive one end 20A of the sensing beam 20. The set screws 16 can then be tightened so that the hub 15 grips the end 20A and prevents any relative movement between the spring disc 10 and the end 20A of the sensing beam 20. As seen more clearly in FIG. 3, the sensing beam 20 is rectangular in its center section with flat surfaces being provided for the strain gauges 41–44 bonded thereto.

A second spring disc 30 substantially identical to the spring disc 10 is provided for holding the second end 20B of the sensing beam 20. The spring disc 30 has slots 30A, spokes 32, set screws 31, 33, 34, and slots 35A in the central hub 35 corresponding to the similar parts of the spring disc 10. It should be noted from FIG. 3 that the diameter of the opening of the hub 35 is greater than the diameter of the opening in the hub 15. It should also be noted that the right end 20B (FIG. 3) of the sensing beam 20 is larger than the left end 20A. The arrangement is such that the sensing beam 20 can be inserted in an axial direction (from right to left in FIG. 3) into the hubs 15 and 35. In practice the hub 15 having the smallest opening is located further from the open end of an axle or support member than the hub 35. Thus, assembly of the apparatus in an axle is facilitated.

The apparatus is adapted for positioning inside an axle 18 and between a point of support for the axle 18 and the point of application of the load to the axle 18. In the case of use on an aircraft, the apparatus is located approximately midway between the vertical strut and the wheel, as shown in FIG. 1C.

Four strain gauges 41–44 are bonded to the sensing beam 20 in the arrangement shown in FIG. 3. The strain gauges are electrically connected in the Wheatstone bridge circuit of FIG. 1B. An energizing signal source 46 is connected by leads 47 and 48 to the strain gauges 41–44 in the manner shown in FIG. 1B. Signal output leads 49 and 50 are connected to the opposite diagonals of the bridge circuit.

The circuit arrangement and the location of the strain gauges are such that when the axle 18 is subjected to a load the circuit of FIG. 1B provides an output signal proportional to the shear forces in the axle. The discs 10 and 30, by being immovably held inside the axle, serve to define a pair of parallel shear planes. Therefore when the axle 18 is loaded the sensing beam will undergo deformation in the general manner indicated in FIG. 1A, giving rise to output signals from the bridge circuit. It should be noted that with the discs 10, 30, held against relative movement with respect to the axle 18, and located as shown in FIG. 1C, the circuit of FIG. 1B provides output signals due to differences in the bending moments at the location of the discs. The discs by being held against slippage are in effect attached to or define parallel shear planes. Thus the output signals are proportional to the vertical component only of the load on the axle 18, and signals from the gauges resulting from the application of a moment only to one end of the axle are self-canceling.

The strain gauges are protected by the metal bellows 51 (such as of steel) welded to the flanges 52 and 53 on the beam 20. A suitable opening 54 is provided in the end 20B for passage of the wires 47–50. A sealing cap 55 welded to the end 20B completes the assembly so that a hermetically sealed chamber is provided for the gauges.

In some applications it is important that the ends of the screws 11 and 31 not mark the wall of the axle. Thus as shown in FIG. 2 pads 19 of heat treated spring steel are bonded to the axle wall in alignment with the pointed screws 11 and 31. In practice the screws 11 are tightened such that the spring discs 10 and 30 are "pre-loaded" by the compressive forces of the screws, the depth to which the screws are seated being determined by the applied torque, the angle of the conical points, and the spring of the spring discs. In practice the apparatus is installed in the manner indicated and then left in position in the vehicle. In the event of a failure of a gauge, only the sensing beam assembly is removed. The replacement therefore can be pre-calibrated and merely reinserted into the discs 10, 30 without any need to remove the discs 10 and 30.

It has been found in practice that by having the holding screws 11 and 31 located around the circumference of the discs 10 and 30 midway between adjacent spokes 12 and 32, respectively, the discs 10, 30 can undergo distortion and flexure and yet retain sufficient rigidly to transmit axle deformation as a strain in the gauges. In the second embodiment shown in FIG. 4 only two spokes are used for holding the hub in the center of the disc, with two set screws serving to hold the disc inside of a structural member. A slot and screw arrangement similar to that of FIG. 2 is used in the embodiment of FIG. 4 to hold the beam in the hub. Note that the disc holding screws in FIG. 4 are located intermediate the spokes, as in the previous embodiment.

With reference now to the third embodiment 110 shown in FIGS. 5 through 7, it is noted that first and second disc members 112 and 113 include outer rims 115 and 116 with the central axis of the rims identified as 117. The interior hubs 118 and 119 are positioned so that hub axis 120 is coincident with the central axis of the rims 117 as the hubs are supported by interiorly extending hub support means 121 and 122 which extend from opposite sides of the rims 115 and 116. The disc members 112 and 113 are secured in a fixed relationship to the interior surface of the structural member (not shown) by means of disc support means 124 and 125 which include adjustable set screws 127 and 128 inserted through locking slots 130 and 131 and held in fixed extended position by locking screws 133 and 134 which cooperate to close the locking slots 130, 131 about the set screws 127, 128 when they are in the proper extended position. In the diametrically opposite side of the disc rims 115 and 116 are positioned extended locking elements 136 which may or may not be adjustable, since it is only necessary for one of the extending support means to be adjustable relative to the outer rim of the disc.

With continued reference to FIGS. 5 through 7, it is noted that the third embodiment 110 includes an elongated strain sensing beam 142 which is firmly held at its ends in hubs 118 and 119 by means of holding weld means 139 and 140 to form a unitary structure together with the disc members 112 and 113. If desired, a metal protective cover 143 may be provided for the strain sensing beam 142. Note that in this third embodiment 110 the sensing beam axis, identified as 145, is coincident with the central axis of the rims 117. To accommodate for expansion and contraction of the strain sensing beam 142, spring disc members 112 and 113 include flexing chambers 147 and 148 defined within the interiorly extending hub support means 11 generally configured normal to the extension of said support means 121 and 122. The unitary structure resulting from the use of a weld or similar securing means 139, 140 for holding the strain sensing beam 142 in a unitary manner within the first and second disc members 112 and 113 yields a shock resistant load measuring system.

Another version of a shock resistant unitary load measuring system is the fourth embodiment 150 illustrated in FIGS. 8 and 9. As shown, first and second disc members 152 and 153 include outer rims 155, 156 which have a central axis 157. The interior extending hub support means in the fourth embodiment is substantially coextensive with the interior hubs 160 and 161, since the hub axis 162 is positioned very close to the outer rims 155, 156, providing the maximum space centrally of the rims 155, 156 for access to the disc support set screws 165 and 166. This particular configuration is especially useful for suspending the measuring assembly 150 within a very small diameter hollow structural member (not shown) in that it provides as much space as possible for insertion of the tool which is used to extend the set screws 165 and 166 radially outwardly from the outer rims 155 and 156. Once the set screws 165 and 166 and locking extensions 168 are firmly attached to the interior surface of the hollow structural member (not shown), locking screws 170 and 171 are turned to close the locking slots 173 and 174 and thereby firmly hold the set screws 165 and 166 in their extended firm attachment position.

In the fourth embodiment 150 it is noted that the elongated sensing beam 176, having a central beam axis 177, is securely and integrally bonded to the hubs 160 and 161 to provide a shock resistant measurement assembly.

Figure 11:
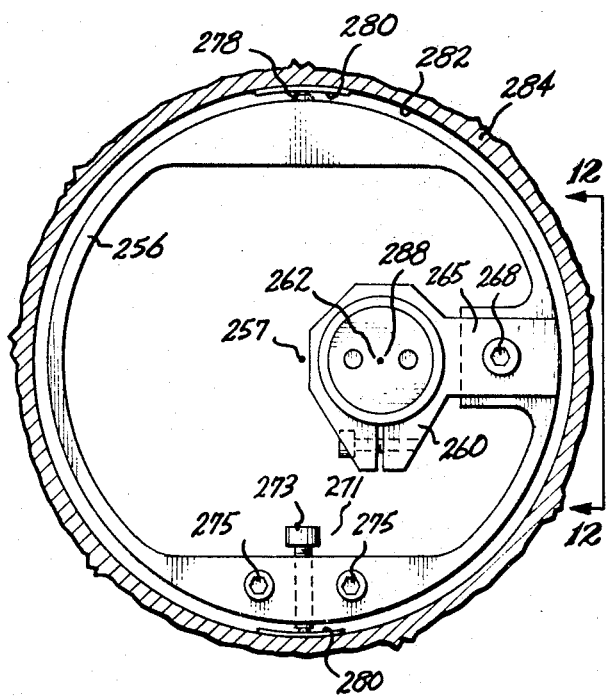
FIG. 11 is an end elevational view of the measuring assembly of FIG. 10.
Figure 12:
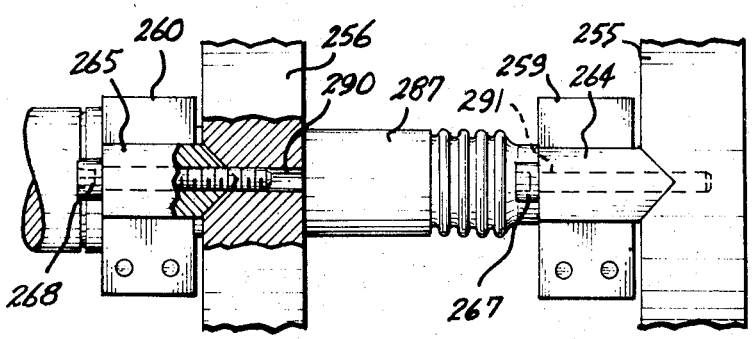
FIG. 12 is a partial cross-sectional view, with some parts removed for clarity, of the measuring assembly taken from lines 12—12 of FIG. 11.

A still further improvement in measuring assemblies is disclosed with reference to FIGS. 10 to 12 wherein the fifth embodiment 250 is illustrated which includes first and second spring disc members 252, 253, including outer rims 255 and 256 having a central axis 257. The rims 255, 256 support interior hubs 259 and 260 about a hub axis 262 by means of the interior extending hub supports 264 and 265. The interior extending hub supports 264, 265 and hubs 259, 260, are detachably secured to the outer rims 255 and 256 by means of fastening bolts 267 and 268 which are held in fastening bolt threaded apertures 290 and 291 defined by outer rims 255 and 256. The disc members 252 and 253 are supported in a fixed position relative to the interior surface 282 of the hollow structural member 284 by support means 270 and 271. Disc support means 270 and 271 include radially extending set screws 273 and diametrically opposed extending locking elements 277 and 278 which firmly engage support pads 280 firmly bonded to the interior surface 282. Once the set screws 273 are firmly positioned, locking screws 274 and 275 are turned to firmly hold set screws 273 in the extended force transmitting position.

As previously mentioned with reference to the fourth embodiment 150, shown in FIGS. 8 and 9, it is sometimes difficult because of the relatively small diameter of the interior portion of the support member, to easily position and adequately extend such screws 273 unless there is sufficient room for inserting a tool into the central portion of the outer rims 255 and 256. For this reason the interior extending hub support means 264 and 265 are foreshortened so that the interior hub axis 262 is laterally displaced from the central axis 257 of the rims 255, 256. Another feature of the fifth embodiment 250, which permits easy replacement of the elongated sensing beam 287 is that of forming the fastening bolt threaded aperture 290 as shown in FIG. 12, to extend completely through the outer rim 256 so that a turning tool may be inserted through the fastening bolt threaded aperture 290 to turn the fastening bolt 267 for securing the interior extending hub support means 264 to the outer rim 255 prior to securing the interior extending means 265 to the outer rim 256. The sequence of removal is in reverse.

There has been disclosed a series of improved load measuring apparatus which, when installed in a hollow structural member, provide a measure of the load borne by the structure. The discs act as springs and are so locked in position that slippage of the same within or along the axle is avoided and thus output signals are proportional to relative displacement of two shear planes defined by the disc in the axle. The spring disc can be made of various materials, including steel and aluminum. The self-seating arrangement for the sensing beam facilitates removal on the embodiments which are detachable and accurate replacement of the sensing beam. The apparatus makes possible the use of precalibrated strain gauge assemblies.

What is claimed is:

1. A load measuring system for measuring a load applied to a hollow structural member comprising in combination: at least two spring disc members each including an outer rim, an interior hub, and interiorly extending hub support means connecting said rim to said hub; disc support means extending radially outwardly from each of said rims, non-aligned with said interiorly extetnding hub support means, for holding said rim in a fixed position inside of the structural member; an elongated sensing beam including first and second end sections and a central section therebetween; holding means for holding said first end section in the hub of one of said disc members and said second end section in the hub of another of said disc members; said interiorly extending hub support means extending a distance less than the distance from said rim to the central axis of said rim such that the axis of said elongated sensing beam is laterally offset from the central axis of said rim; and beam strain sensing means responsive to deflection of said beam.

2. The system of claim 1, wherein: said holding means bonds said end sections together with said disc members forming a unitary shock resistant structure.

3. The system of claim 1, wherein: said interiorly extending hub support means of each of said disc members is detachably secured to said rims by screw means threaded into threaded apertures defined by said rims.

4. The system of claim 3, wherein: one of said threaded apertures in said rim extends clear through one of said rims to provide a chamber for insertion of a tool therethrough to turn the screw means holding said interiorly extending means to said other rim.

5. A load measuring system for measuring a load applied to a hollow structural member comprising in combination: at least two spring disc members each including an outer rim, an interior hub, and interiorly extending hub support means connecting said rim to said hub; disc support means extending radially outwardly from each of said rims, non-aligned with said interiorly extending hub support means, for holding said rim in a fixed position inside of the structural member; an elongated sensing beam including first and second end sections and a central section therebetween; holding means for holding said first end section in the hub of one of said disc members and said second end section in the hub of another of said disc members; said interiorly extending hub support means extending from opposite sides of said rims to position said hubs such that the axis of said sensing beam is coaxial with the central axis of said rims; and beam strain sensing means responsive to deflection of said beam.

6. The system of claim 5, wherein: said interiorly extending hub support means defines flexing chambers extending generally normal to the direction extended by said extending means for permitting said hubs to be deflected axially of said rims as a result of expansion and contraction of said sensing beams.

7. The system of claim 5, wherein: said holding means bonds said end sections together with said disc members forming a unitary shock resistant structure.

References Cited

UNITED STATES PATENTS

| 3,327,270 | 1/1967 | Garrison | 338—2 |
| 3,273,382 | 9/1966 | Fonash | 73—88.5 |
| 3,212,321 | 10/1965 | Kyle | 73—88.5 |
| 3,184,188 | 5/1965 | Rossire | 244—77 |
| 3,168,826 | 2/1965 | Paetow | 73—141 |
| 3,034,347 | 5/1962 | Starr | 73—141 |
| 2,544,738 | 5/1951 | Tint | 73—133 |
| 3,426,586 | 2/1969 | Kadlec | 73—88.5 |

RICHARD C. QUEISSER, Primary Examiner

J. J. WHALEN, Assistant Examiner

U.S. Cl. X.R.

73—141; 177—136